(12) United States Patent
Yoshida

(10) Patent No.: US 7,545,534 B2
(45) Date of Patent: Jun. 9, 2009

(54) IMAGE PROCESSING APPARATUS, METHOD AND PROGRAM BINARIZING RECEIVED IMAGE DATA

(75) Inventor: Hiroki Yoshida, Takatsuki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 543 days.

(21) Appl. No.: 11/298,108

(22) Filed: Dec. 9, 2005

(65) Prior Publication Data

US 2006/0126087 A1    Jun. 15, 2006

(30) Foreign Application Priority Data

Dec. 13, 2004    (JP)    ............................. 2004-359709

(51) Int. Cl.
*H04N 1/40* (2006.01)

(52) U.S. Cl. ....................... 358/1.9; 358/2.99; 382/173; 382/232

(58) Field of Classification Search .................. 358/1.9, 358/2.99, 3.06, 462; 382/173, 176, 232, 382/237
See application file for complete search history.

(56) References Cited

U.S. PATENT DOCUMENTS

| 4,893,188 | A | * | 1/1990 | Murakami et al. | ............ 358/2.1 |
| 4,953,013 | A | * | 8/1990 | Tsuji et al. | .................. 358/530 |
| 4,996,603 | A | * | 2/1991 | Kanemitsu et al. | .......... 358/462 |
| 5,001,576 | A | * | 3/1991 | Tanaka et al. | ................ 358/462 |
| 6,351,562 | B1 | * | 2/2002 | Kadono et al. | ............... 382/232 |

FOREIGN PATENT DOCUMENTS

JP    2001-222683 A    8/2001

* cited by examiner

*Primary Examiner*—Thomas D Lee
(74) *Attorney, Agent, or Firm*—Sidley Austin LLP

(57) ABSTRACT

An image processing apparatus receives and binarizes image data in accordance with first and second algorithms to output first and second binarized data which are in turn compared and in accordance with a result of the comparison a region to be corrected is determined in the first binarized data. The region to be corrected then has a value of a pixel binarized in accordance with a third algorithm and replaced with the binarized value.

18 Claims, 14 Drawing Sheets

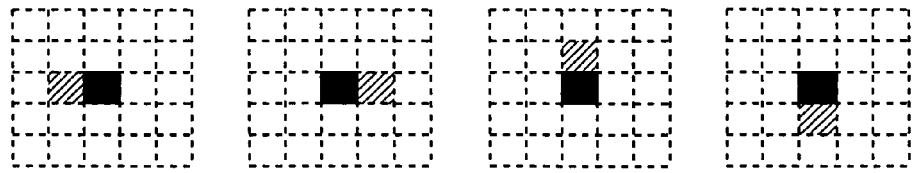
FIG. 6A   FIG. 6B   FIG. 6C   FIG. 6D
FIG. 7A
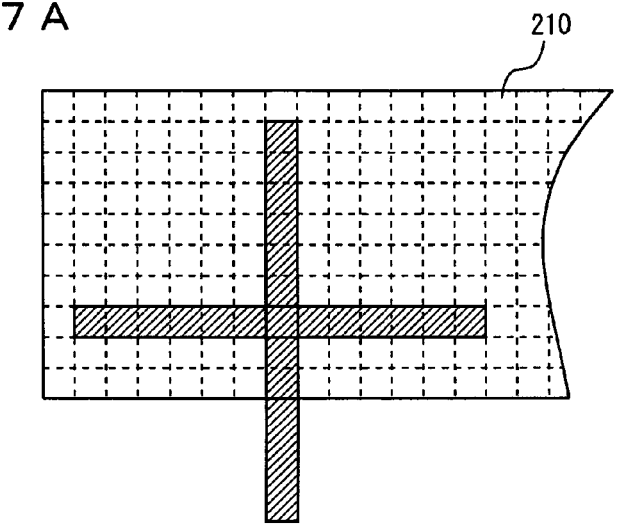
FIG. 7B
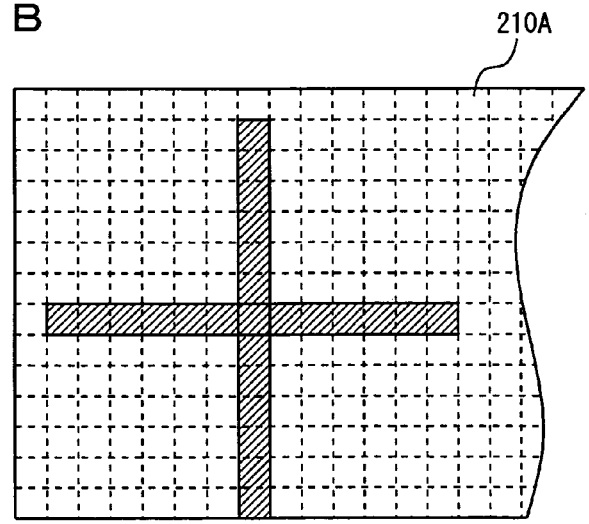

F I G. 1 1
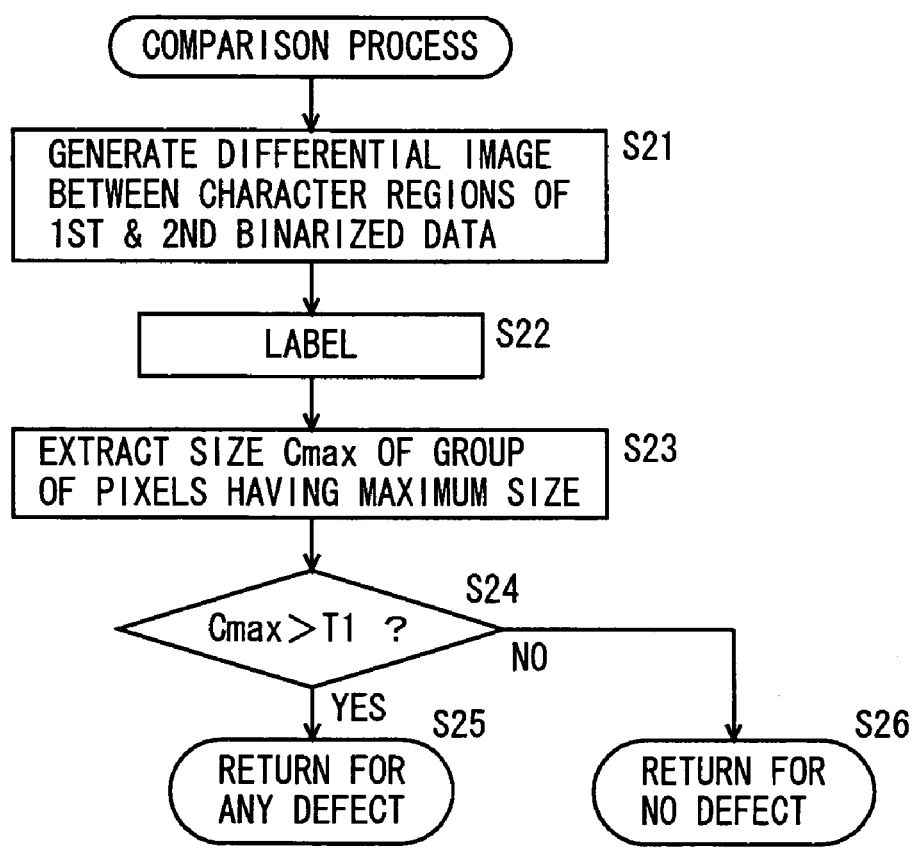

F I G. 1 8
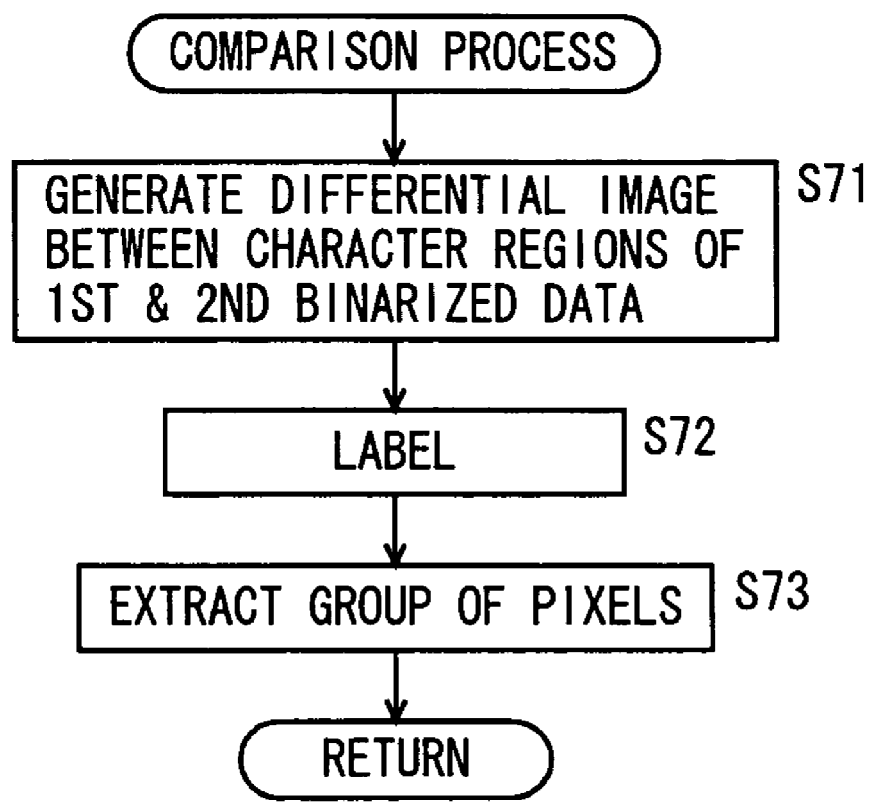

IMAGE PROCESSING APPARATUS, METHOD AND PROGRAM BINARIZING RECEIVED IMAGE DATA

This application is based on Japanese Patent Application No. 2004-359709 filed with the Japan Patent Office on Dec. 13, 2004, the entire content of which is hereby incorporated by reference.

BACKGROUND OF THE INVENTION

1. Field of the Invention

The present invention relates generally to image processing apparatuses, methods and programs, and particularly to image processing apparatuses, methods and programs binarizing image data.

2. Description of the Related Art

Conventionally for image data a region including a character is binarized (see for example Japanese Laid-Open Patent Publication No. 2001-222683). To speed up this binarization process, image processing apparatuses often have a dedicated hardware circuit mounted therein. To reduce the cost of the apparatus, the dedicated hardware circuit employs a relatively small capacity of memory and image data is divided into band data and binarized.

The image data is divided regardless of its specific content: it is divided as based on its amount of data. As such, a character may be divided into a plurality of band data. This can cause the character to be determined in one band data as a character and in the other band data as other than a character. Furthermore, the hardware circuit binarizes the image data in accordance with a predetermined algorithm, and for example if the hardware circuit has some types of algorism, an image or the like including a character configured of lines existing densely may not be determined as a character. As a result, the character has a portion or its entirety unbinarized and thus lost, resulting in binarized data contributing to an image impaired in quality.

SUMMARY OF THE INVENTION

The present invention has been made to overcome the disadvantage described above and it contemplates an image processing apparatus, method and program that can alleviate load on a process to speed up the process, and also provide binarized data allowing an image to be improved in quality.

In accordance with the present invention the image processing apparatus includes: a first binarizer receiving image data and binarizing the image data in accordance with a first algorithm to output first binarized data; and a controller receiving the image data and the first binarized data. The controller includes; a second binarizer receiving the image data and binarizing the image data in accordance with a second algorithm different from the first algorithm to generate second binarized data; a comparator comparing the first and second binarized data; a determinator driven by a result of comparison by the comparator to determine a region to be corrected in the first binarized data; a third binarizer binarizing the region in accordance with a third algorithm different from the second algorithm; and a replacer replacing a value of a pixel of the region with that of a pixel binarized in accordance with the third algorithm.

In accordance with the present invention image data is binarized in accordance with first and second algorithms to provide first and second binarized data, respectively, which are in turn compared and in accordance with a result of the comparison a region to be corrected is determined. Then the region to be corrected of the first binarized data is binarized in accordance with a third algorithm and a value of a pixel of the region to be corrected included in the first binarized data is replaced with that of a pixel binarized in accordance with the third algorithm. A defect of the binarization in accordance with the first algorithm is determined by comparing the first and second binarized data and a region to be corrected of the first binarized data that has defect is replaced with the third binarized data provided in accordance with the third algorithm. If the third algorithm is complex and requires time for a process, image data is not entirely binarized but has only a portion, or a region to be corrected, binarized by the third algorithm. The process can be reduced in load and thus performed faster, and the binarized data can also provide an image improved in quality.

In accordance with the present invention the image processing method is executed by an image formation apparatus including a first binarizer receiving image data and binarizing the image data in accordance with a first algorithm to output first binarized data. The method includes the steps of: receiving the image data and the first binarized data; binarizing the image data in accordance with a second algorithm different from the first algorithm to generate second binarized data; comparing the first and second binarized data; determining a region to be corrected in the first binarized data, as based on a result of comparison provided by the step of comparing; binarizing the region in accordance with a third algorithm different from the second algorithm; and replacing a value of a pixel of the region with that of a pixel binarized in accordance with the third algorithm.

A process can be reduced in load and thus performed faster, and the binarized data can also provide an image improved in quality.

In accordance with the present invention the image processing program is executed by an image formation apparatus receiving image data, the program causing the image formation apparatus to perform the steps of: binarizing the image data in accordance with a first algorithm to output first binarized data; binarizing the image data in accordance with a second algorithm different from the first algorithm to generate second binarized data; comparing the first and second binarized data; determining a region to be corrected in the first binarized data, as based on a result of comparison provided by the step of comparing; binarizing the region in accordance with a third algorithm different from the second algorithm to binarize the image data; and replacing a value of a pixel of the region with that of a pixel binarized in accordance with the third algorithm.

A process can be reduced in load and thus performed faster, and the binarized data can also provide an image improved in quality.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 6A-6D are diagrams for specifically illustrating the labeling process in the first embodiment.

FIGS. 7A and 7B are diagrams for illustrating an extension of a character region in the first embodiment.

FIG. 11 is a flow chart of a subroutine of a comparison process executed in FIG. 10.

FIG. 18 is a flow chart of a subroutine of a comparison process indicated in FIG. 17.

DESCRIPTION OF THE PREFERRED EMBODIMENTS

Hereinafter reference will be made to the drawings to describe embodiments of the present invention. In the following description, identical components are identically denoted. They are also identical in name and function.

First Embodiment

Figure 1:
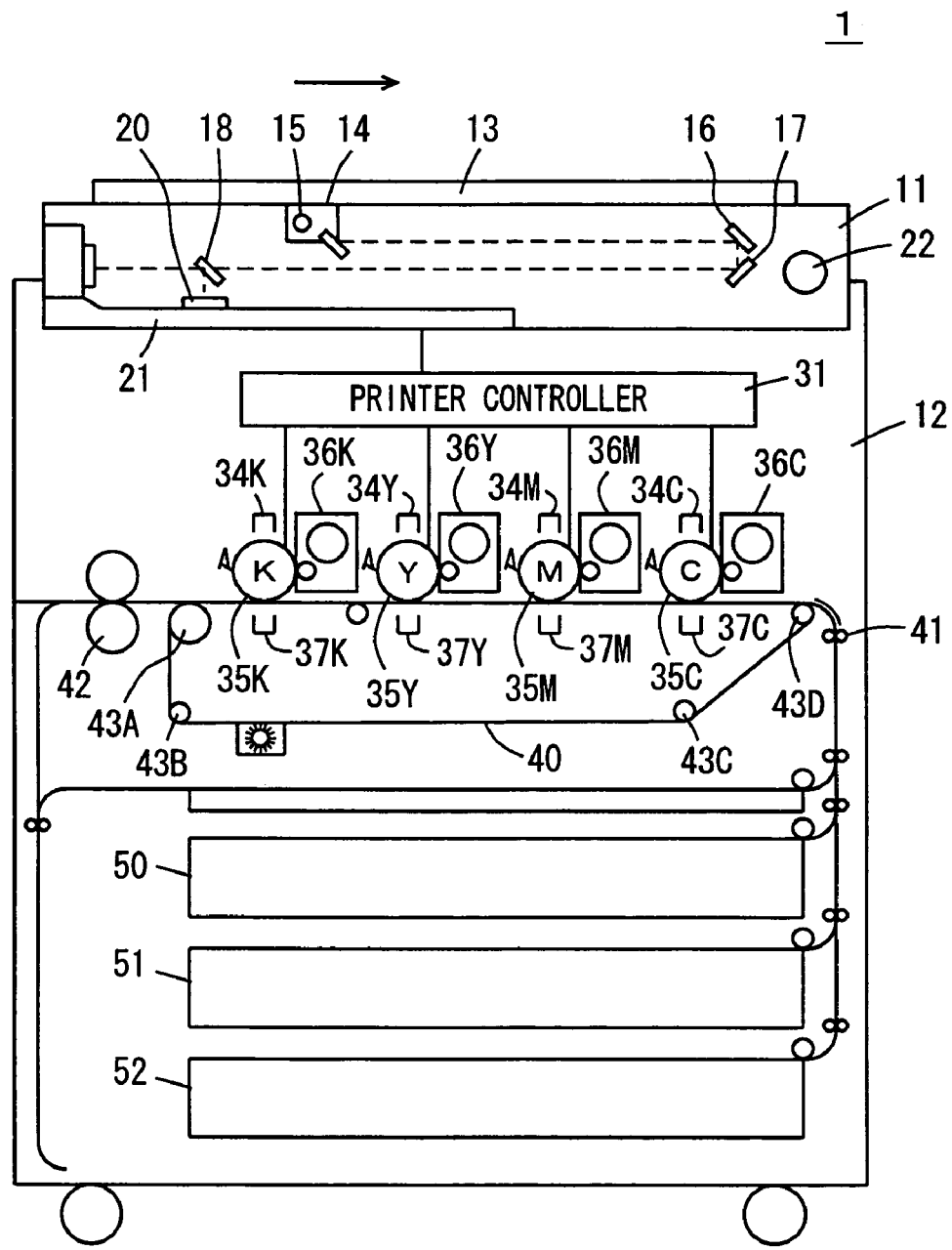
FIG. 1 is a diagrammatic cross section schematically showing a configuration of a multi function peripheral (MFP) in a first embodiment of the present invention.

Initially will be described a schematic configuration of an MFP in the present embodiment. With reference to FIG. 1, an MFP 1 includes a scanner unit 11 reading image data from an original, and a printer unit 12 printing an image on a sheet.

Scanner unit 11 has a platen 13, on which the original is placed. A scanner 14 includes an exposure lamp 15 exposing the original to light. Scanner 14 is moved by a scanner motor 22 in a direction indicated by an arrow to scan across the original. A surface of the original reflects the light, which is in turn transmitted via mirrors 16-18 and through a condenser and imaged on a charge coupled device (CCD) 20. CCD 20 converts the reflection of light to RGB color data (an analog signal) and outputs the color data to a scanner controller 21. The color data output from CCD 20 to scanner controller 21 is referred to as image data.

Scanner controller 21 subjects the image data received from CCD 20 to a prescribed image process to output a digital signal to a printer controller 31.

The digital signal output from scanner controller 21 to printer controller 31 is image color data C, M, Y, K for cyan, magenta, yellow, black, respectively. In accordance with the received image color data C, M, Y, K, printer controller 31 outputs a laser beam to photoreceptor drums 35C, 35M, 35Y, 35K for cyan, magenta, yellow, black, respectively.

In printer unit 12 the laser beam output from scanner controller 21 exposes photoreceptor drums 35C, 35M, 35Y, 35K, which are charged by chargers 34C, 34M, 34Y, 34K, to form an electrostatic latent image. Developers 36C, 36M, 36Y, 36K corresponding to the four colors of cyan, magenta, yellow and black develop the electrostatic latent image on photoreceptor drums 35C, 35M, 35Y, 35K.

An endless belt 40 is wound around a driving roller 43A and fixed rollers 43B, 43C and 43D such that the belt does not sag. As driving roller 43A rotates counterclockwise as seen in the figure, endless belt 40 similarly rotates at a prescribed rate.

Sheet feed cassettes 50-52 feed an appropriate sheet and from a timing roller 41 to endless belt 40 the sheet is supplied. Endless belt 40 receives and carries the sheet thereon and transports the sheet leftwards as seen in the figure. Thus the sheet contacts first photoreceptor drum 35C corresponding to cyan, followed by photoreceptor drums 35M, 35Y, 35K corresponding to magenta, yellow and black, respectively. When the sheet contacts photoreceptor drums 35C, 35M, 35Y, 35K, transfer chargers 37C, 37M, 37Y, 37K paired with the photoreceptor drums transfer onto the sheet an image of toner developed on the photoreceptor drums.

The sheet having the image of toner transferred thereon is heated by a pair of fusing rollers 42. Thus the toner is fused and thus fixed on the sheet. Subsequently the sheet is output from printer unit 12.

Furthermore MFP 1 includes a network controller, a facsimile and a hard disk for communicating with another networked equipment, and includes in addition to the aforementioned image reading and forming function an electronic mail transmission and reception function, a file transfer function, a facsimile transmission and reception function, a data printing function, and a file storage function.

Figure 2:
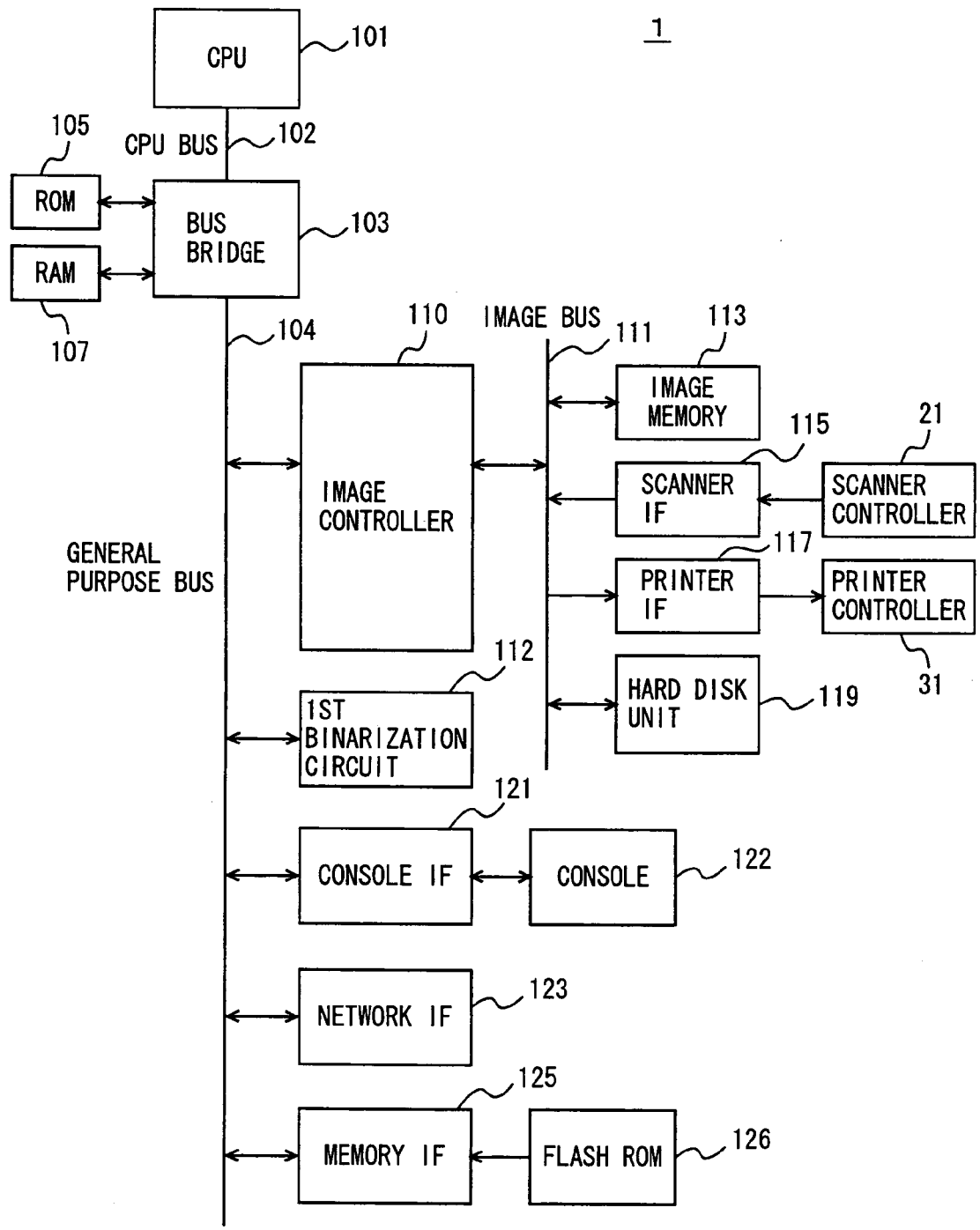
FIG. 2 is a block diagram of a circuit configuration of the MFP shown in FIG. 1.

FIG. 2 is a block diagram showing a circuit configuration of the MFP in the present embodiment. With reference to the figure, MFP 1 includes a CPU 101 generally controlling MFP 1, a bus bridge 103 connected to CPU 101 via a CPU bus 102, a read only memory (ROM) 105 and a random access memory (RAM) 107 connected to bus bridge 103, an image controller 110 connected to bus bridge 103 by a general purpose bus 104, respectively, a first binarization circuit 112, a console interface (IF) 121, a network interface (IF) 123, and a memory interface (IF) 125.

Console IF 121 is connected to a console 122. Network IF 123 is connected to a network. To memory IF 125 a flash ROM 126 is attachable.

Connected to image controller 110 by an image bus 111 are an image memory 113, a scanner interface (IF) 115, a printer interface (IF) 117, and a hard disk unit 119. Connected to scanner IF 115 and printer IF 117 are scanner controller 21 and printer controller 31, respectively.

Network IF 123 is connected to a network to connect MFP 1 to another computer via the network. Network IF 123 receives data from CPU 101 and outputs the data to the network, and receives data from the network and outputs the data to CPU 101.

Image controller 110 is controlled by CPU 101 to control inputting and outputting image data. Image data received from another computer via network IF 123, image data received from scanner IF 115, or image data read from a hard disk (located in hard disk unit 119) is output to printer controller 31 or hard disk unit 119. If the image data is output to printer controller 31, image controller 110 performs a process converting the image data to data printable by printer 12.

The first binarization circuit 112 is controlled by CPU 101 to process received image data in accordance with a first algorithm so that a character region having a character represented therein is binarized to output binarized image data.

The first algorithm may be any well known algorithm that allows a region of image data that has a character represented therein to be binarized to output binarized data. The predetermined algorithm includes a process that determines an attribute of a pixel, a process that enhances an edge, and/or the like.

The first binarization circuit 112 is required to have high processing rate. Accordingly, it is configured of hardware. The first binarization circuit 112 has non-volatile memory as a working memory and receives image data partially. RAM 107 is capable of storing image data by several to several tens lines. As such, the memory's cost is reduced.

The first binarization circuit 112 may effect a binarization process that determines for each pixel whether the pixel is a character attribute to binarize only a value of a pixel determined as a character attribute, or a binarization process that initially determines for each pixel whether the pixel is a character attribute, and then binarizes values of any pixels included in a character region in a rectangle circumscribing a pixel determined as a character attribute.

Console 122 includes an input device receiving an input from a user for an operation, and a display unit displaying information.

Hard disk unit 119 stores image data read by the scanner, a compressed and coded version thereof, image data received from another computer via network IF 123, a compressed version thereof, and/or similar data input to MFP 1.

Attached to memory IF 125 is flash ROM 126 having an image processing program stored therein and executed by CPU 101. Note that MFP 1 may further include an electrically erasable/programmable read only memory (EEPROM) and the program may be stored in the EEPROM and read therefrom, rather than from flash ROM 126. In other words, CPU 101 may be adapted to execute a program stored in the EEPROM. Furthermore, the EEPROM is rewritable or additionally writable, and another networked computer may rewrite a program stored in MFP 1 at the EEPROM or write an additional program thereto. Furthermore, MFP 1 may download a program from another networked computer and store the program to the EEPROM.

MFP 1 is connected to a network, which may be a local area network (LAN) or may be the Internet or a general public line, either wired or wireless.

Note that while in the present embodiment MFP 1 executes an image processing program stored in flash ROM 126 and thus distributed by way of example, MFP 1 may execute an image processing program carried by a different type of storage medium, such as a flexible disk, a cassette tape, a compact disk-read only memory (CD-ROM), a hard disk, an optical disk (a magnetic optical disk (MO))/(a mini-disk (MD)/a digital versatile disk (DVD)), an IC card (including a memory card), an optical card, a mask ROM, an EPROM, an EEPROM, or other similar semiconductor memory fixing and thus carrying the program. Furthermore, MFP 1 may execute an image processing program downloaded from another apparatus via a network.

Furthermore a "program" as referred to herein includes not only a program executable directly by CPU 101 but also a program in the form of a source program, a compressed program, an encrypted program, and the like.

In the present embodiment MFP 1 executes a process encoding and compressing image data. Image data to be compressed includes image data read in scanner unit 11, image data received from another computer via network IF 123, and image data read from hard disk unit 119. Furthermore, the image data includes full-color image data and monochromatic, multi-value image data.

The image data is compressed in a format including Portable Document Format (PDF), Joint Photographic Experts Group (JPEG), Joint Bi-level Image Experts Group (JBIG) and other similar general compression formats. Which one of a plurality of compression formats is selected is determined by an input received from a user operating a screen for selection displayed on console 122 to indicate which compression format is selected. Data compressed by CPU 101 is stored to hard disk unit 119 in a prescribed area. When image data has a character region binarized, and compressed and encoded, it provides an image improved in quality and is compressed more efficiently. Accordingly, CPU 101 extracts and compresses only the character region of the image data. To perform the compression process rapidly, CPU 101 causes the first binarization circuit 112 to perform a process extracting a character region from image data and binarizing the character region.

As has been described previously, the first binarization circuit has a limit in determining a character region precisely as the circuit has a limited capacity of memory usable as a working memory and follows a predetermined algorithm to determine the character region. With the working memory having the limited capacity of memory, image data will partially be subjected to a process. The first binarization circuit 112 is capable of storing image data for example by several to several tens lines, and a portion of image data that is to be processed is referred to as a band. The first binarization circuit 112 performs a binarization process including a process extracting a character region for each band. For example if a character region is divided into two bands for the sake of illustration, a region that should be determined for one band as a character and for the other band as the character may erroneously be determined as a photograph. Such erroneous decision is often made for example when the other band includes the photograph adjacent to the character. Furthermore, such erroneous decision is also often made when a single character is divided into two bands. If a pixel has its attribute determined erroneously, the pixel is not binarized, resulting in a character partially lost, smeared or the like. In the present embodiment MFP 1 corrects by an image processing program executed by CPU 101 the binarized data output from the first binarization circuit 112.

Figure 3:
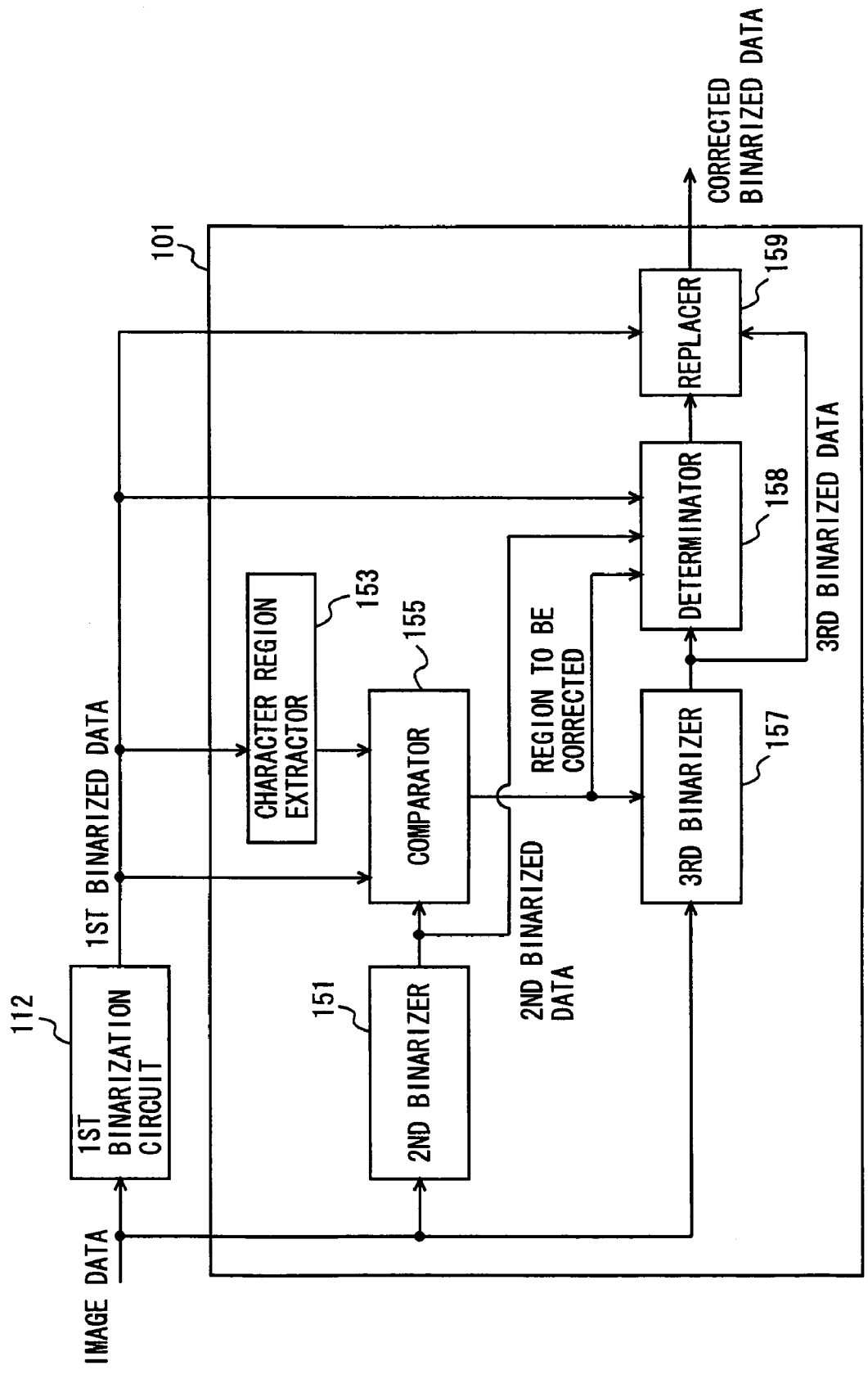
FIG. 3 is a functional block diagram showing a function of a central processing unit (CPU) shown in FIG. 2.

CPU 101 functions as described hereinafter. With reference to FIG. 3, CPU 101 includes a second binarizer 151 binarizing image data in accordance with a second algorithm to output second binarized data, a character region extractor 153 extracting a character region from the first binarzed data, a comparator 155 comparing the first and second binarized data, a third binarizer 157 binarizing image data in accordance with a third algorithm to output third binarized data, a determinator 158 determining whether a character attribute extracted by character region extractor 153 is correct, and a replacer 159 replacing the first binarized data with the third binarized data.

CPU 101 receives image data such as that output from scanner controller 21, and the first binarized data output from the first binarization circuit 112.

The second binarizer 151 receives and binarizes the image data in accordance with the second, predetermined algorithm. In contrast to the first algorithm, to allow a reduced processing time in CPU 101 the second algorithm does not effect a process that determines a region. The second algorithm compares a value of each pixel of image data with a prescribed threshold value and binarizes it to output the second binarized data. The prescribed threshold value may be predetermined or may be variable with the value of the pixel of the interest.

Character region extractor 153 receives the first binarized data from the first bianrization circuit 112. As has been described previously, the first binarized data is a binary representation of a value of a pixel determined as a character attribute or a value of a pixel included in a character region in a rectangle circumscribing a pixel determined as a character attribute. Accordingly, a value of a pixel that is not determined as a character attribute or that of a pixel of a region that is not determined as a character region is all set as a value of a pixel corresponding to a space (e.g., a value of "255"). The first binarized data is equal in size to the image data. While the first binarization circuit 112 provides binarization for each band, CPU 101 receives binarized data formed of data binarized for each band that are composited together. Accordingly, character region extractor 153 extracts as a character region from the value of each pixel of binarized data a region of adjacent pixels having a value which does not correspond to that of a space. More specifically, character region extractor 153 extracts a rectangular region circumscribing a set of pixels having values, respectively, which do not correspond to that of a space. The character region is specified by information indicating a position and a size in the binarized data. Note that the character region may be specified by data equal in size to the binarized data, such as data including information indicating a position in image data.

Comparator 155 receives the first and second binarized data and (data specifying) the character region, and compares the character region of the first binarized data with that of the second binarized data. Comparator 115 then determines whether the character region of the first binarized data should be corrected, and if it so determines, the character region is output to the third binarizer 157 as a region to be corrected.

The third binarizer 157 receives the image data and the region to be corrected, and follows the third algorithm to binarize the received region to provide third binarized data which is in turn output to determinator 158 and replacer 159. The third algorithm may be any well known algorithm. It may be identical to the first algorithm. The third algorithm may include an edge enhancement process, a noise removal process and the like. The third binarizer 157 does not binarize the image data entirely. Rather, it binarizes the region to be corrected. As such, the third binarizer 157 can process a reduced number of pixels and thus provide a binarization process in a shorter period of time than when the image data is entirely binarized.

Determinator 158 receives the first, second and third binarized data, and receives from comparator 155 the region to be corrected. Determinator 158 employs the first, second and third binarized data to determine whether the image data's character region is a character region having a character represented therein. If so, determinator 158 outputs a permission signal to replacer 159, otherwise outputs a prohibition signal to replacer 159.

Replacer 159 receives the first and third binarized data and (the data specifying) the region to be corrected. Furthermore, replacer 159 receives the permission or prohibition signal from determinator 158. Replacer 159 responds to the permission signal by replacing the region to be corrected of the first binarized data with that of the third binarized data. Thus a region that has been erroneously binarized by the first binarization circuit 112 is replaced with a region to be corrected that has been correctly binarized by the third binarizer 157. Furthermore, replacer 159 responds to the prohibition signal by replacing a value of a pixel of a region to be corrected of the first binarized data with that of a pixel of a space (e.g., a value of "255"). Thus a region to be corrected that has been erroneously determined as a character region and binarized by the first binarization circuit 112 is determined as a region other than a character region.

Figure 4:
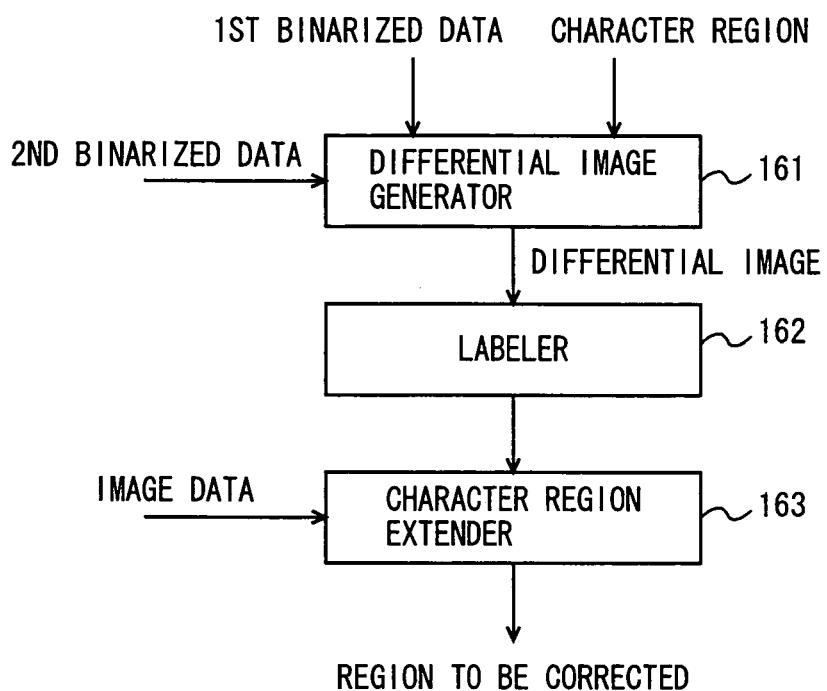
FIG. 4 is a functional block diagram showing a function of a comparator shown in FIG. 3.

Comparator 155 functions as described hereinafter. With reference to FIG. 4, comparator 155 includes a differential image generator 161, a labeler 162, and a character region extender 163. Differential image generator 161 receives the first and second binarized data and a character region, and calculates a difference between a character region of the first binarized data and that of the second binarized data to generate a differential image. The first and second binarized data are data setting as "1" a value of a pixel forming a character and as "0" a value of a pixel which does not form a character. The differential image is calculated as a difference between values of corresponding pixels in the character regions of the first and second binarized data, respectively. If the difference is negative it may be set as "1". The differential image is the same in size and position as the character region and is binarized data setting as "1" a value of a pixel different in value between corresponding pixels of the first and second binarized data, respectively.

Labeler 162 analyzes the differential image to determine whether the character region of the first binarized data should be corrected. This decision is made as based on a size of a group of pixels extracted from pixels included in the differential image, the group being formed of pixels having a value of "1" and adjacent to each other. The size of the group of pixels is the number of the pixels included in the group of pixels. Note that the decision may not be made from the size of the group of pixels and may instead be determined from the number of pixels adjacent in a prescribed direction. The group of pixels is extracted by a labeling process.

Figure 5A:
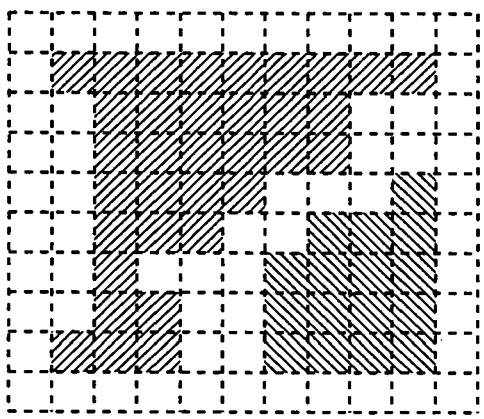
FIGS. 5A and 5B are diagrams for illustrating a labeling process in the first embodiment.
Figure 5B:
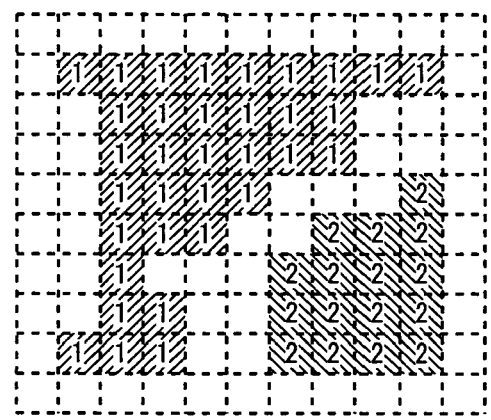

Reference will now be made to FIGS. 5A and 5B to describe the labeling process.

FIG. 5 shows a portion of a differential image. A square sectioned by a broken line indicates a single pixel, and a hatched square indicates a value of "1" and an unhatched square indicates a value of "0". The labeling process labels adjacent pixels of "1" identically. Different groups of such pixels are labeled differently.

FIG. 5B shows a labeled image. A square sectioned by a broken line indicates a pixel corresponding to each pixel of a differential image. In the figure a group of pixels labeled "1" and that of pixels labeled "2" are shown.

With reference to FIGS. 6A-6D, how the labeling process is performed will specifically be described. The labeling process identically labels adjacent pixels to be identical in value and compares a value of a pixel to be processed with those of pixels adjacent thereto in upward, downward, rightward and leftward directions.

FIG. 6A shows an example of comparing in value the pixel to be processed with that adjacent thereto in the leftward direction. FIG. 6B shows an example of comparing in value the pixel to be processed with that adjacent thereto in the rightward direction. FIG. 6C shows an example of comparing in value the pixel to be processed with that adjacent thereto in the upward direction. FIG. 6D shows an example of comparing in value the pixel to be processed and that adjacent thereto in the downward direction.

In the labeling process the pixel to be processed is compared in value first with the leftward adjacent pixel, followed by the rightward, upward and downward adjacent pixels, and if the adjacent pixels have their respective values equal to that of the pixel to be processed the adjacent pixels are labeled to be identical to the pixel to be processed. When the leftward, rightward, upward and downward adjacent pixels have been compared, the initially, identically labeled pixel is set as a pixel to be processed, and compared with pixels adjacent thereto in the leftward, rightward, upward and downward directions. Pixels to be processed are set in an order in which they are labeled, and when no more pixels to be set as that to be processed exist, the labeling process for a single group of pixels completes.

With reference again to FIG. 4, labeler 162 determines from a size of a group of pixels extracted in the labeling process whether the character region of the first binarized data should be corrected. This decision is made for example if:

(1) of groups of pixels extracted from the differential image, that formed of a maximum number of pixels is formed of a number of pixels that is equal to or larger than a prescribed value T1;

(2) there is extracted at least a prescribed number T3 of groups formed of at least a prescribed number T2 of pixels extracted from the differential image;

(3) a group of pixels extracted from the differential image has a maximum number of pixels adjacent in a single direction that is equal to or larger than a prescribed value T4, the single direction including lateral, vertical and oblique directions.

Note that while herein a group of pixels is extracted by a labeling process by way of example for the sake of illustration, alternatively a rectangular region circumscribing a pixel of "1" in value may be extracted from the differential image and a set of pixels included in that region may be set as a group of pixels.

Character region extender 163 extends a character region to include a character completely and outputs the extended character region to the third binarizer 157. Herein the extended character region is referred to as a region to be corrected.

As has been described previously, a character region is a region extracted by character region extracter 153 from the first binarized data generated by the first binarization circuit 112 performing a binarization process for each band. As such, for example if a single character is divided into two bands, a pixel corresponding to the character may for one band be determined as a character region and binarized and for the other band not be determined as a character region nor binarized. In that case, the character region will be extracted as a region failing to include a portion of a single character. Character region extender 163 performs a process to extend a character region to include a pixel forming a character that has not been binarized as it was not determined by the first binarization circuit 112 as a character region for the other band.

To determine a range in which the character region is extended, character region extender 163 labels in a manner (1) or (2), as described hereinafter, an edge image calculated from image data or the exact image data.

(1) Labeling an Edge Image Calculated from Image Data

An edge image is calculated from image data and until an edge included in a character region ends the character region is extended. More specifically, the edge image is labeled and if there exists a labeled pixel outer than a perimeter of the character region, the character region is extended until that pixel's label no longer exists outer than the perimeter, or a circumscribing rectangle including any sets of edge pixels or any groups of pixels labeled identical to a pixel included in the character region is set as a further character region.

(2) Labeling the Exact Image Data

Each pixel of image data is labeled with a pixel value. Thus a pixel of an identical color is identically labeled, and a character region is extended until adjacent pixels included in the character region and identical in color all appear. More specifically, the image data is labeled and if there exists outer than a perimeter of the character region a pixel provided with a label other than that of a background color, the character region is extended until that pixel's label no longer exists outer than the perimeter, or a circumscribing rectangle including any sets of edge pixel or any groups of pixels provided with a label other than that of the background color and a pixel included in the character, is set as a further character region.

With reference to FIGS. 7A and 7B, the labeling process is employed to extend a character region, as described hereinafter.

FIG. 7A shows a relationship between a labeled image and a character region. Hatched pixels are identically labeled. Identically labeled pixels are not all included in a character region 210.

FIG. 7B shows a relationship between the labeled image and the character region extended. Hatched pixels are identically labeled. Identically labeled pixels are all included in a character region 210A.

FIGS. 8A-8D are diagrams for illustrating a character region.

Figure 8A:
FIGS. 8A-8D are diagrams for illustrating a character region in the first embodiment.

FIG. 8A shows a relationship between the character region and first binarized data. The figure shows an example of first binarized data 201 having a character with a lower half portion unbinarized. In this example, character region 210 is extracted by character region extracter 153 as a region including only a portion of the character that has been binarized.

Figure 8B:
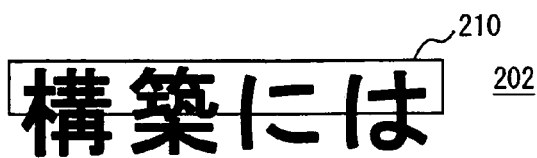

FIG. 8B shows a relationship between the character region and second binarized data. Second binarized data 202 has the character entirely binarized as an algorithm different from the first binarization circuit 112 is employed to binarizing image data. As such, character region 210 does not include the entirety of character included in the second binarized data.

Figure 8C:
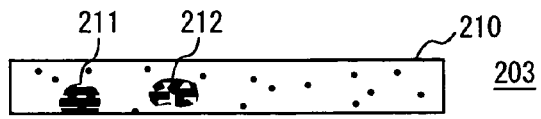

FIG. 8C shows a relationship between the character region and a differential image. A differential image 203 is the same in size and position as the character region, and includes only a difference between the character regions of the first and second binarized data 201 and 203, respectively.

Figure 8D:
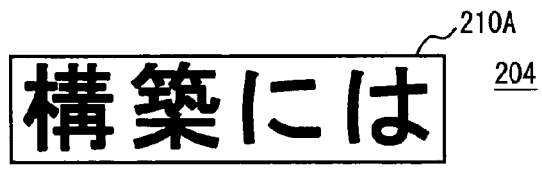

FIG. 8D shows a relationship between a region to be corrected and image data. A region to be corrected 210A is shown to be character region 210 that has been extended until it becomes a region including the image data's character completely.

Figure 9:
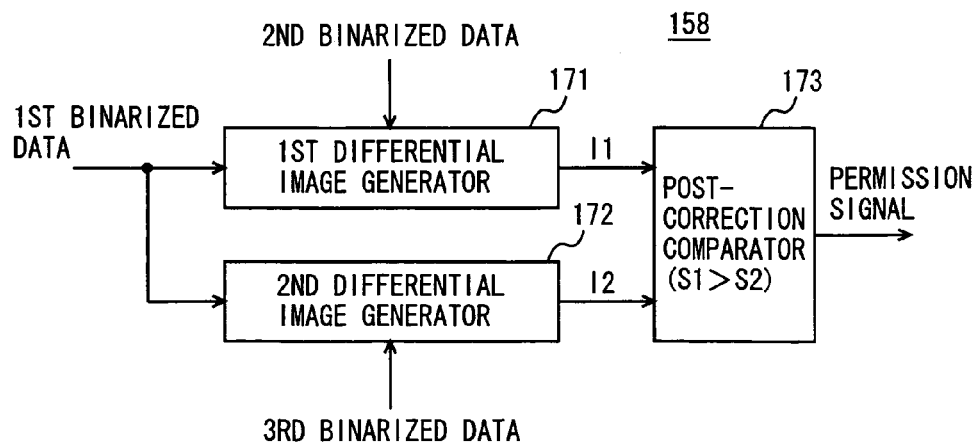
FIG. 9 is a functional block diagram showing a function of a determinator shown in FIG. 3.

FIG. 9 is a functional block diagram representing a function of determinator 158. With reference to the figure, determinator 158 includes a first differential image generator 171, a second differential image generator 172, and a post-correction comparator 173. The first differential image generator 171 receives the first and second binarized data and a character region and generates a first differential image I1 of the character region from the first and second binarized data and outputs the first differential image 11 to post-correction comparator 173. The first and second binarized data are data setting as "1" a value of a pixel forming a character and as "0" a value of a pixel which does not form a character. The first differential image 11 is generated by calculating a difference between values of corresponding pixels in the character regions of the first and second binarized data, respectively. If the difference is negative it may be set as "1". The first differential image I1 is the same in size and position as the character region and is binarized data setting as "1" a value of a pixel different in value between corresponding pixels of the first and second binarized data, respectively.

Note that MFP 1 may be adapted to allow post-correction comparator 173 to receive the first differential image I1 from comparator 155. In that case, the first differential image generator 171 can be dispensed with.

The second differential image generator 172 receives the first and third binarized data and the character region and generates a second differential image I2 of the character region from the first and second binarized data and outputs the second differential image I2 to post-correction comparator 173. The third binarized data is data setting as "1" a value of a pixel forming a character and as "0" a value of a pixel which does not form a character. The second differential image I2 is generated by calculating a difference between values of corresponding pixels in the character regions of the first and third binarized data, respectively. If the difference is negative it may be set as "1". The differential image is the same in size and position as the character region and is binarized data setting as "1" a value of a pixel different in value between corresponding pixels of the first and third binarized data, respectively.

Post-correction comparator 173 receives the first and second differential images I1 and I2 and if a number S1 of pixels included in the first differential image I1 and having a value of "1" is larger than a number S2 of pixels included in the second differential image I2 and having the value of "1" a decision is made that the character region of the image data is a region having a character represented therein and the permission signal is output to replacer 159. Otherwise the prohibition signal is output to replacer 159.

Figure 10:
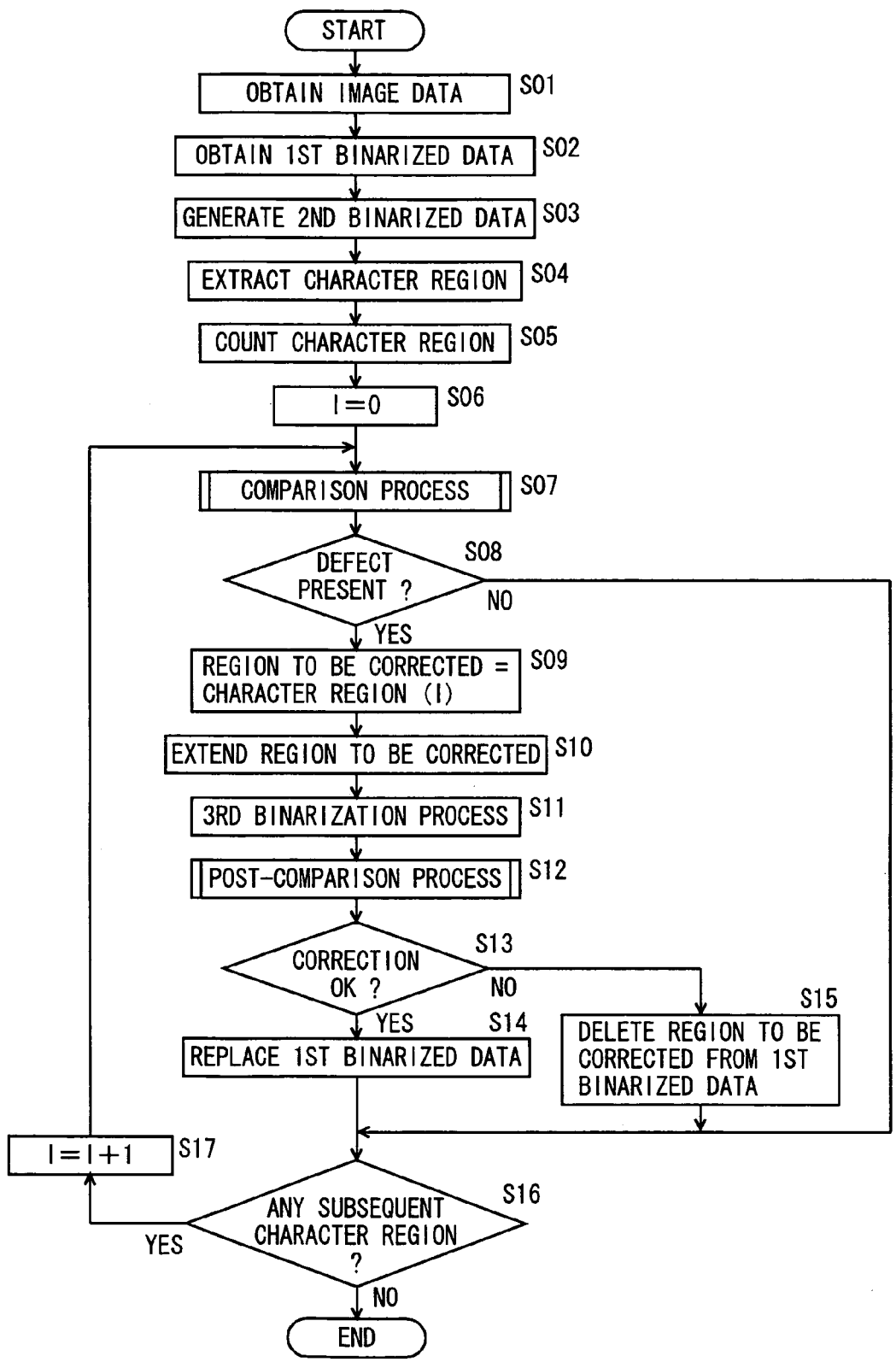
FIG. 10 is a flow chart of an image process executed in the CPU shown in FIG. 2.

Reference will now be made to FIG. 10 to describe an image process effected by CPU 101 of MFP 1 in the first embodiment. Herein the image process corresponds to a process correcting the first binarized data provided through the binarization performed by the first binarization circuit 112.

With reference to the figure, initially image data is obtained (step S01). The obtained image data is temporarily stored in RAM 107, and from the first binarization circuit 112 the first binarized data is obtained (step S02). The first binarized data is obtained by bands and stored to RAM 107 in the order in which it is obtained. When binarized data are obtained for all bands, RAM 107 will have stored therein binarized data having the same size as the image data.

Subsequently in step S03 the image data stored in RAM 107 is binarized in accordance with the second algorithm to generate the second binarized data. The second binarized data has the same size as the image data, and is stored to RAM 107.

From the first binarized data stored in RAM 107 a character region is extracted (step S04) and the number of character regions extracted is counted (step S05). If more than one character region is extracted, the extracted character regions are provided with numbers, respectively, starting from zero as identification information to specify each character region. Herein for the sake of illustration a character region numbered I is represented as a character region (I). Subsequently in step S06 a variable I is set to be "0". Thus step S07 et seq. will be performed for a character region (0).

In step S07, character regions (I)s of the first and second binarized data, respectively, stored in RAM 107 are compared, as will be described more specifically later.

As a result of the comparison in step S07 a decision is made as to whether the character region of the first binarized data has a defect (step S08). If so the process proceeds to step S09, otherwise to step S16.

In step S09, character region (I) is set as a region to be corrected, and the region to be corrected is extended (step S10). This step is effected by character region extender 163 described above. If the region to be corrected has a character partially included therein, the region will be extended to include the character completely. A pixel or region that has erroneously not been determined by the first binarization circuit 112 as a character attribute can thus be included in the region to be corrected.

Subsequently the region to be corrected of the first binarized data stored in RAM 107 undergoes a third binarization process (step S11). More specifically, the first binarized data's region to be corrected is binarized in accordance with the third algorithm to generate the third binarized data. The third binarized data has the same size as the region to be corrected. The third bianrized data is stored to RAM 107. The third binarized data can be generated fast since even if CPU 101 effecting the binarization process in accordance with the third algorithm is large in load it is only required that the region to be corrected alone be binarized.

Then a decision is made as to whether the region to be corrected of the first binarized data stored in RAM 107 is a character region (step S12) and the decision determines how the process branches (step S13). If it is determined as a character region the process proceeds to step S14 to correct the region to be corrected, otherwise the process proceeds to step S15 to delete the region to be corrected from the first binarized data.

In step S14 the region to be corrected of the first binarized data stored in RAM 107 is replaced with the third binarized data. More specifically, the first bianrized data's region to be corrected is rewritten with the third binarized data. In step S15, in contrast, the region to be corrected of the first binarized data stored in RAM 107 is deleted. More specifically, a value of a pixel included in the region to be corrected of the first binarized data is rewritten to be a value of a pixel of a space, i.e., "255".

In step S16 a decision is made as to whether there exists a character region to be subsequently processed. If so the process proceeds to step S117, otherwise the process ends. The step S16 decision is made by determining whether variable I has reached the number of character regions as counted at step S05.

In step S17 variable I is incremented by "1". Thus, with a further region to be processed set as character region (I), steps S07-S15 are repeated.

With reference to FIG. 11 the comparison process performed in step S07 will now be more specifically described.

With reference to the figure, the comparison process is effected as follows: Initially in step S21 a differential image is generated between character regions of the first and second binarized data, respectively, stored in RAM 107. The differential image has the same position and size in the image data as the character region. Then for the differential image a group of adjacent pixels having a value of "1" is identically labeled (step S22). A set of identically labeled pixels is a group of pixels.

Then of such groups of pixels the size of a group of pixels that is largest in size is extracted (step S23). More specifically, a number C of identically labeled pixels of each group of pixels included in the differential image is counted and a maximum value thereof Cmax is extracted.

A decision is made as to whether maximum value Cmax exceeds the predetermined value T1 (step S24) and if so the process proceeds to step S25, otherwise to step S26. In step S25 the S08 decision is set as "defect present" whereas in step S26 the S8 decision is set as "no defect" and the process returns to step S07.

Note that in the above described comparison process at step S23 a number C1 of any groups formed of at least the predetermined number T2 of pixels may be counted and at step S24 a decision may be made for number C1, and if number C1 is equal to or larger than the predetermined number T3 the process may proceed to step S25, otherwise to step S26.

Furthermore in step S23 a maximum value of a number of laterally adjacent pixels, that of vertically adjacent pixels and that of obliquely adjacent pixels in group of pixels may be obtained and if the maximum value is equal to or larger than the prescribed value T4 the process may proceed to step S25, otherwise to step S26.

Figure 12:
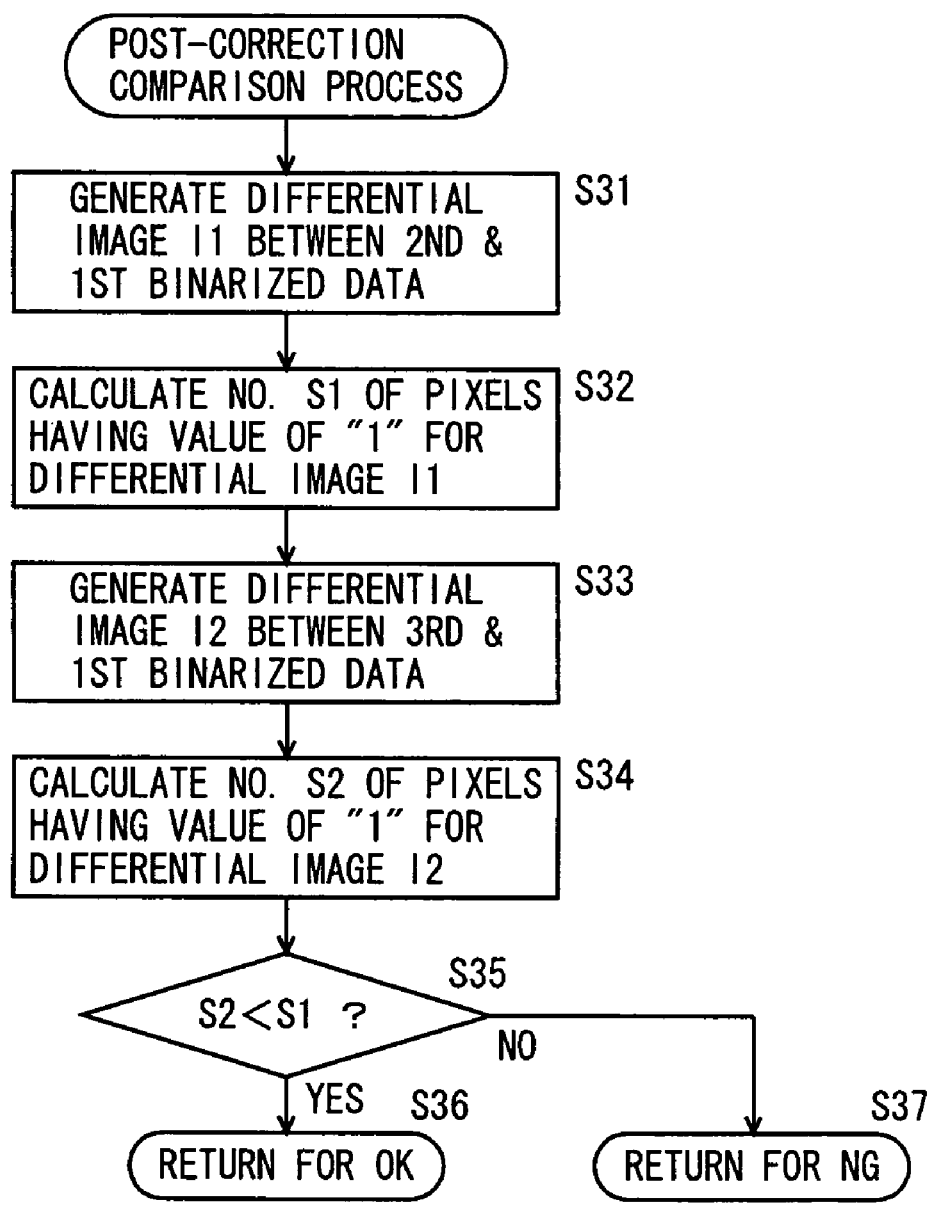
FIG. 12 is a flow chart of a subroutine of a post-correction comparison process effected in FIG. 10.

Then with reference to FIG. 12, the post-correction comparison process effected as indicated in FIG. 10 at step S12 will more specifically be described. With reference to the figure, from the first and second binarized data stored in RAM 107 the first differential image I1 of a character region is generated (step S31) and a number S1 of pixels included in the first differential image I1 and having a value of "1" is calculated (step S32). Then from the character region of the first binarized data and the third binarized data stored in RAM 107 the second differential image I2 of the character region is generated (step S33) and a number S2 of pixels included in the second differential image I2 and having the value of "1" is calculated (step S34).

Then, whether number S2 is smaller than number S1 is determined (step S35). If so the process proceeds to step S36. Otherwise the process proceeds to step S37. In step S36 a signal "OK" (or the permission signal) indicating that it is a region to be corrected is returned to replacer 159 to cause the process to return to step S12. In step S37 a signal "NG" (or the prohibition signal) indicating that it is not a region to be corrected is returned to replacer 159 to cause the process to return to step S12.

The third algorithm can take a larger number of pixels to be processed than the first algorithm, and the pixel's attribute can be determined more accurately. In step S35 if the third binarized data has a larger difference from the second binarized data than the first binarized data, a decision is made that the region to be corrected is not a character region but a region of a different attribute. This allows the first binarized data to exclude a pixel of an attribute other than that of a character.

Thus in MFP 1 in the first embodiment a defect of a binarization process effected by a first algorithm is determined by comparing first and second binarized data and a region to be corrected of the first binarized data that has defect is replaced with third binarized data provided by a third algorithm through binarization. If the third algorithm is complex and requires time for a process, image data is not entirely binarized but has only a portion, or a region to be corrected, binarized by the third algorithm. The process can be reduced in load and improved in rate, and the binarized data can also provide an image improved in quality.

Furthermore, a character region in the form of a rectangle including a character is extracted from the first binarized data, and the character region of the first binarized data is compared with that of the second binarized data. A region to be corrected can be determined by comparing a reduced region. This can eliminate an unnecessary process and allows a process to be performed faster.

Furthermore, as the region to be corrected is extended, a pixel forming a character that has not been determined as a character region in the first binarized data can be included in the region to be corrected. The binarized data can thus provide an image improved in quality.

Furthermore if the third binarized data provided by the third binarizer 157 through binarization provides a larger number of pixels of an image different from the first binarized data than the second binarized data provided by the second bianrizer 151 through binarization does, a value of a pixel of a region to be corrected is replaced with that of a pixel of a space. A region erroneously detected as a character can be deleted and a character region can be detected more precisely.

Second Embodiment

A second embodiment provides an MFP, as described hereinafter. As has been described previously, the first binarization circuit 112 generating the first binarized data determines an attribute for each pixel and if only a value of a pixel determined as an attribute of a character is binarized there may be included in a single character a pixel determined as the character attribute and that which is not so determined. In that case, the first binarized data will include a pixel of the single character that is not binarized and thus has a value of "0". In the second embodiment the MFP corrects a portion of a character that has not been binarized as the first binarization circuit 112 erroneously failed to determine it as a character attribute.

In the first embodiment MFP 1 corrects a character region. The MFP in the second embodiment defers from MFP 1 of the first embodiment in that the former corrects a region determined as based on a group of pixels extracted from a character region. Hereinafter the MFP in the second embodiment will be described mainly for a feature thereof different from MFP 1 of the first embodiment.

Figure 13:
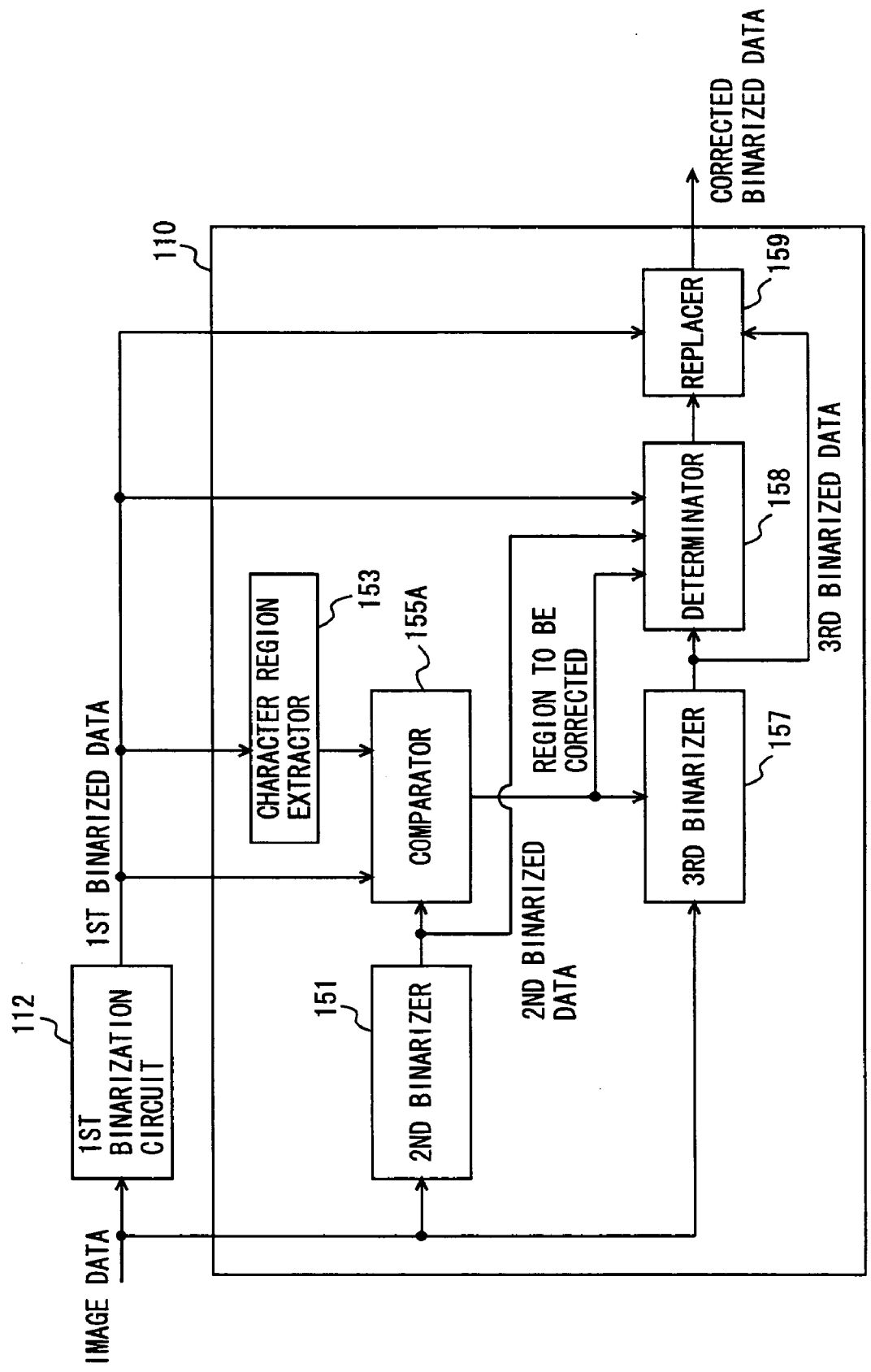
FIG. 13 is a functional block diagram showing a function of a CPU of an MFP in a second embodiment.
Figure 14:
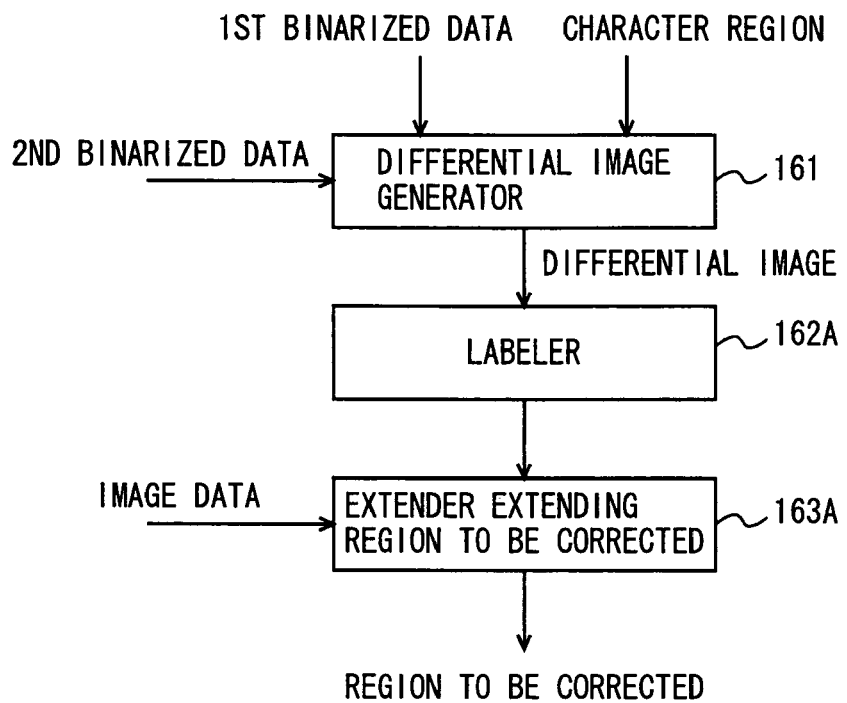
FIG. 14 is a functional block diagram showing a function of a comparator shown in FIG. 13.

With reference to FIG. 13 the present embodiment provides MFP 1 having CPU 101 functioning as will be described hereinafter. Note that CPU 101 of the present embodiment corresponds to that of the first embodiment with comparator 155A modified in function. With reference to FIG. 14 comparator 155A functions as described hereinafter.

With reference to the figure, comparator 155A includes a differential image generator 161, a labeler 162A and an extender 163A extending a region to be corrected.

Differential image generator 161 calculates a differential between character regions of the first and second binarized data, respectively, to generate a differential image. Labeler 162A analyzes the differential image and extracts a region to be corrected.

Labeler 162A extracts from pixels included in the differential image a group of adjacent pixels having a value of "1" that has at least a prescribed size, and determines the extracted group of pixels as a region to be corrected. The size of the group of pixels is the number of pixels included in the group of pixels. Furthermore, the size of the group of pixels may be the number of pixels adjacent in a prescribed direction. The group of pixels is extracted by labeling.

More specifically, labeler 162A labels the differential image. Thus a plurality of groups of adjacent pixels having a value of "1" is determined. Then of the plurality of group of pixels a group of pixels that has at least a prescribed number of identically labeled pixels is determined as a region to be corrected. Herein, for the convenience of process, a region to be corrected is adapted to be a rectangle. Accordingly, the region to be corrected is adapted to be a region in a rectangle circumscribing a group of pixels.

Extender 163A extends the region to be corrected, as determined by labeler 162A, to at least include all of the pixels forming one character. To determine an extent to which the region to be corrected is extended, extender 163A labels an edge image calculated from image data or the exact image data.

Figure 15:
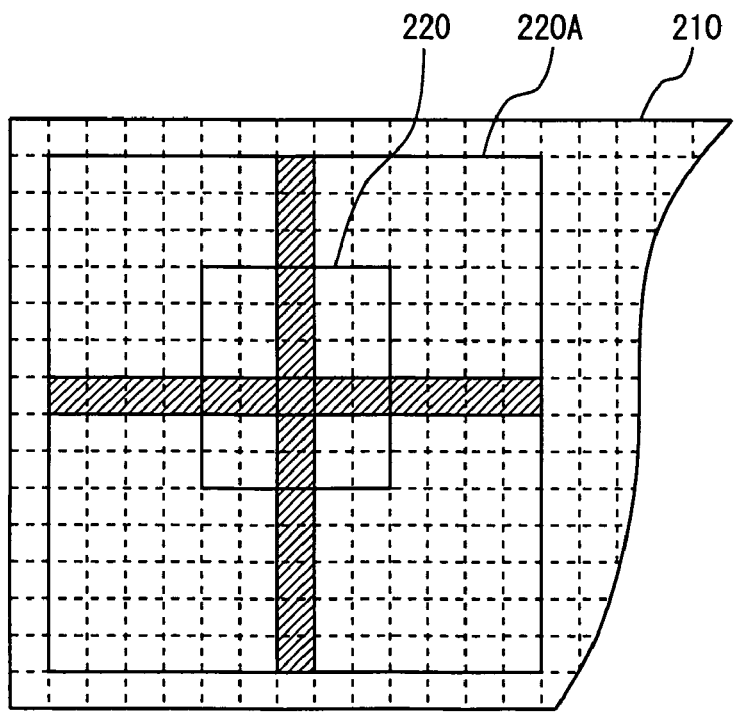
FIG. 15 is a diagram for illustrating an extension of a region to be corrected using a labeling process.

How a region to be corrected is extended by employing labeling will now be described. With reference to FIG. 15, character region 210 includes a character in the form of a cross and a region to be corrected 220 is initially extracted for the sake of illustration. A hatched pixel indicates a pixel identically labeled. The region to be corrected 220 does not include all of identically labeled pixels. The region to be corrected 220 is extended to be a region 220A to allow identically labeled pixels to be all included in character region 220A and as a result a single character to be completely included in character region 220A.

The region to be corrected will now be described.

Figure 16A:
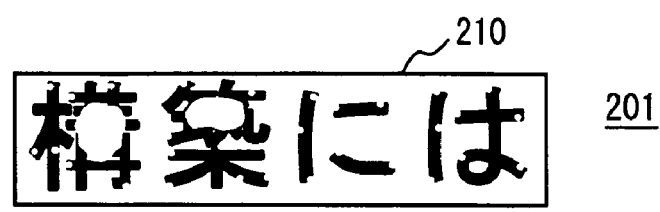
FIGS. 16A-16D are diagrams for illustrating a region to be corrected.

FIG. 16A shows a relationship between a character region and the first binarized data. It shows an example of the first binarized data 201 having a character partially unbinarized.

Figure 16B:
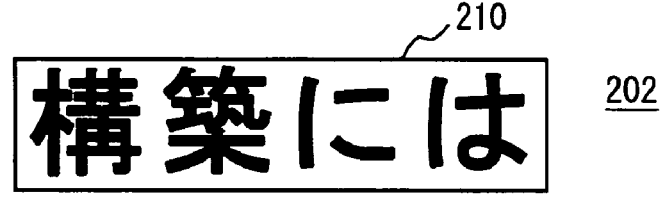

FIG. 16B shows a relationship between the character region and the second binarized data. The second binarized data 202 is provided by binarizing image data in accordance with an algorithm different from the first binarization circuit 112. As such, the second binarized data 202 will not have a character partially lost.

Figure 16C:
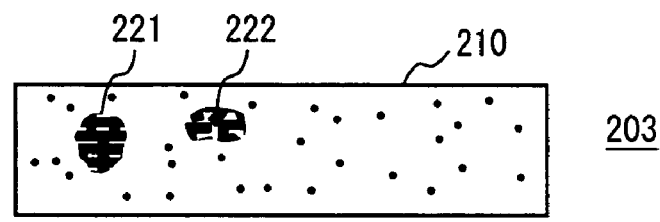

FIG. 16C shows a relationship between the region to be corrected and a differential image. A differential image 203 has the same size and position as character region, and includes only a difference between character regions of the first and second binarized data 201 and 202, respectively. Then, of differential image 203, regions to be corrected 221 and 222 including a group of pixels in which pixels having difference are mutually adjacent, are shown. A group of pixels that has adjacent pixels having difference and is small in size is not set as a region to be corrected.

Figure 16D:
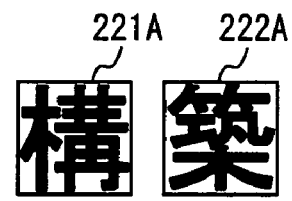

FIG. 16D shows the region to be corrected that has been extended. The figure shows the region to be corrected 221 that has been extended to include a single kanji character (the leftmost character shown in FIG. 16B), or a region to be corrected 221A, and the region to be corrected 222 that has been extended to include a single kanji character (the second leftmost character in FIG. 16B), or a region to be corrected 222A.

In the present embodiment MFP1 has CPU 101 effecting an image process, as described hereinafter.

Figure 17:
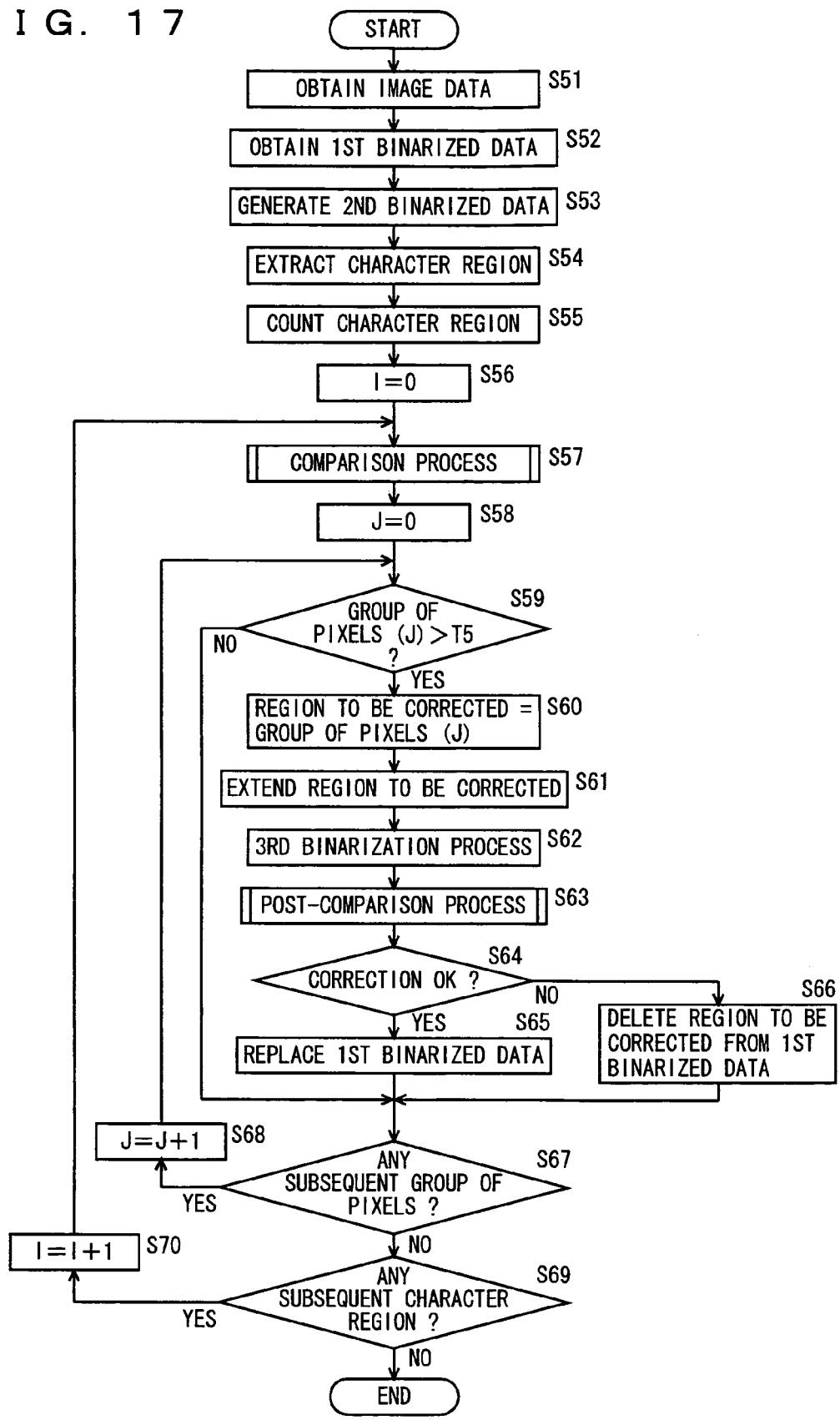
FIG. 17 is a flow chart of an image process executed in the CPU of the MFP in the second embodiment.

With reference to FIG. 17, steps S51-S56 are identical to steps S01-S06 shown in FIG. 10.

In step S57, character regions (I)s of the first and second binarized data, respectively, stored in RAM 107 are compared. This comparison extracts from character region (I) a group of pixels that is formed of at least a prescribed number of pixels. The number of such groups of pixels extracted is counted. If more than one such group of pixels is extracted, the extracted groups of pixels are provided with numbers, respectively, starting from zero as identification information to specify each group of pixels. Herein for the sake of illustration a group of pixels numbered I is represented as a group of pixels (J).

Subsequently in step S58 a variable J is set to be "0". Thus steps S59-S67 will be performed for a group of pixels (0).

In step S59 a decision is made as to whether the number of pixels forming the group of pixel (J) exceeds a threshold value T5. If so the process proceeds to step S60, otherwise to step S67. In step S60 the group of pixels (J) is set as a region to be corrected and the process proceeds to step S61.

In step S61 the region to be corrected is extended. This step is effected by extender 163A. More specifically, if the region to be corrected is a portion of a single character, the region to be corrected is extended to include the character completely. This can prevent two portions forming a single character from being binarized by different algorithm. An improved image quality can thus be achieved.

Subsequently the region to be corrected of the first binarized data stored in RAM 107 undergoes a third binarization process (step S62). More specifically, the first binarized data's region to be corrected is binarized in accordance with the third algorithm to generate third binarized data. Accordingly the third binarized data has the same size as the region to be corrected. The third binarized data is stored to RAM 107. The third binarized data can be generated fast since even if CPU 101 effecting the binarization process in accordance with the third algorithm is large in load it is only required that the region to be corrected alone be binarized in accordance with the algorithm.

Then a decision is made as to whether the region to be corrected of the first binarized data stored in RAM 107 is a character region (step S63) and the decision determines how the process branches (step S64). If it is determined as a character region the process proceeds to step S65 to correct the region to be corrected, otherwise the process proceeds to step S66 to delete the region to be corrected from the first binarized data.

In step S65 the region to be corrected of the first binarized data stored in RAM 107 is replaced with the third binarized data. More specifically, the first binarized data's region to be corrected is rewritten with the third binarized data. In step S66, in contrast, the region to be corrected of the first binarized data stored in RAM 107 is deleted. More specifically, the first binarized data's region to be corrected is rewritten to have a value of a pixel of a space, i.e., "255".

In step S67 a decision is made as to whether there exists a group of pixels to be subsequently processed. If so the process proceeds to step S68, otherwise the process proceeds to step S69. It is determined by whether variable J has reached the number of groups of pixels as counted at step S57. In step S68 variable J is incremented by "1" and for the group of pixels (J) steps S59-S66 are repeated.

In step S69 a decision is made as to whether there exists a character region to be subsequently processed. If so the process proceeds to step S70, otherwise the process ends. It is determined by whether variable I has reached the number of character regions as counted at step S55. In step S70 variable I is incremented by "1" and for character region (J) steps S57-S67 are repeated.

With reference to FIG. 18 the comparison step indicated in FIG. 17 at step S57 will more specifically be described.

With reference to the figure, in step S71 a differential image is generated between character regions of the first and second binarized data, respectively, stored in RAM 107. The differential image has the same position and size in the image data as the character region. Then for the differential image a group of adjacent pixels having a value of "1" is identically labeled (step S22). A set of identically labeled pixels is a group of pixels.

Then of the character region a group of pixels that is formed of identically labeled pixels is extracted (step S73). Simultaneously, the number of such groups of pixels extracted is counted.

Thus in the second embodiment MFP 1 extracts a group of adjacent pixels different in value between the first and second binarized data and determines, from the number of pixels included in a group of pixels extracted from a character region, the character region as a region to be corrected. Even if the first binarized data has a plurality of character regions, it is binarized by the third algorithm only when it is necessary. This can eliminate an unnecessary process and thus allows a process to be performed faster. Furthermore, the first binarized data can have a region to be corrected binarized by the third algorithm. This can prevent a single character from being binarized by different algorithms and thus allows binarized data to provide an image improved in quality.

Furthermore, a region to be corrected can include at least one character. This can prevent a character from being binarized by partially different algorithm and thus allows binarized data to provide an image improved in quality.

Note that while the first and second embodiments have been described for MFP 1, it is needless to say that the present invention can be considered as an image processing method or program causing a computer to perform the process shown in FIGS. 10-12 or FIGS. 17 and 18.

Thus in accordance with the present invention a rectangular character region including a character can be extracted from the first binarized data and the character region of the first binarized data can be compared with that of the second binarized data. A pixel that has not been binarized for the first binarized data may be binarized for the second binarized data, and a pixel erroneously unbinarized in the first binarization means can thus be extracted. Furthermore, a region to be corrected can be determined by comparing a reduced region. This can eliminate an unnecessary process and thus allows a process to be performed faster.

Furthermore in the present invention a group of adjacent pixels different in value between the first and second binarized data can be extracted and from the number of pixels included in a group of pixels extracted from a character region the character region can be determined as a region to be corrected. Even if the first binarized data has a plurality of character regions, it can be binarized by the third algorithm only when it is necessary. This can eliminate an unnecessary process and thus allows a process to be performed faster.

Furthermore in the present invention a group of adjacent pixels different in value between the first and second binarized data can be extracted and a region to be corrected can be determined as based on a region determined by a group of pixels extracted from a character region. Of the character region only a required region can be binarized in accordance with the third algorithm. An unnecessary process can be eliminated and a process can be performed faster.

Furthermore in the present invention a region to be corrected can be extended to include a pixel forming a character that has not been determined for the first binarized data as a character region. Binarized data can thus provide an image improved in quality. Furthermore, a region to be corrected can be adapted to include at least one character. This can prevent a character from being binarized in accordance with partially different algorithm, and binarized data can provide an image improved in quality.

Furthermore in the present invention if a value binarized by the third binarization means has a larger difference from that binarized by the second binarization means than that binarized by the first binarization means does, i.e., if the value binarized by the third binarization means is less preferable than that binarized by the second binarization means, there is a high possibility that a region that is not a character has erroneously been detected by the first binarization means as a character. A value of a pixel of a region to be corrected can be replaced with a prescribed value, and a region erroneously detected as a character can be deleted. Thus a character region can be detected with improved precision.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
a first binarizer receiving image data and binarizing said image data in accordance with a first algorithm to output first binarized data; and
a controller receiving said image data and said first binarized data, said controller including
a second binarizer receiving said image data and binarizing said image data in accordance with a second algorithm different from said first algorithm to generate second binarized data,
a comparator comparing said first and second binarized data,
a determinator driven by a result of comparison by said comparator to determine a region to be corrected in said first binarized data,
a third binarizer binarizing said region in accordance with a third algorithm different from said second algorithm, and
a replacer replacing a value of a pixel of said region with that of a pixel binarized in accordance with said third algorithm.

2. The apparatus according to claim 1, wherein said first binarizer includes an extractor extracting a character region from said image data and binarizes only said character region to output said first binarized data.

3. The apparatus according to claim 1, wherein said first binarizer includes a second determinator determining an attribute of a pixel included in said image data, and in accordance with a value of a pixel that said second determinator determines has an attribute of a character said first binarizer binarizes said image data to output said first binarized data.

4. The apparatus according to claim 1, wherein:
said controller includes an extractor extracting from said first binarized data received a character region including a character; and
said comparator compares said character region of said first binarized data and said character region of said second binarized data.

5. The apparatus according to claim 4, wherein:
said comparator includes an extractor extracting a group of adjacent pixels different in value between said first and second binarized data; and
said determinator determines said character region as said region to be corrected in accordance with a number of pixels included in said group of pixels extracted from said character region.

6. The apparatus according to claim 5, wherein said determinator further includes an extender extending said region to be corrected extracted.

7. The apparatus according to claim 1, wherein:
said comparator includes an extractor extracting a group of adjacent pixels different in value between said first and second binarized data; and
said determinator determines said region to be corrected, as based on a region determined by said group of pixels extracted.

8. The apparatus according to claim 7, wherein said determinator further includes an extender extending said region to be corrected extracted.

9. The apparatus according to claim 8, wherein said extender includes a generator generating an edge image from said image data, and extends said region to be corrected until an edge included in said region to be corrected completely appears.

10. The apparatus according to claim 8, wherein said extender extends said region to be corrected until a pixel included in said region to be corrected of said first binarized data input changes in color.

11. The apparatus according to claim 1, wherein said second binarizer includes a generator employing a prescribed threshold value to simply binarize a value of a pixel included in said image data to generate simple binarized data.

12. The apparatus according to claim 1, further comprising:
  a post-correction comparator comparing with said second binarized data third binarized data provided by said third binarizer; and
  a deleter replacing a value of a pixel of said region to be corrected included in said first binarized data with a prescribed value if said post-correction comparator provides a result of comparison larger than that of comparison provided by said comparator comparing said first and second binarized data.

13. An image processing method executed by an image formation apparatus including a first binarizer receiving image data and binarizing said image data in accordance with a first algorithm to output first binarized data, the method comprising the steps of:
  receiving said image data and said first binarized data;
  binarizing said image data in accordance with a second algorithm different from said first algorithm to generate second binarized data;
  comparing said first and second binarized data;
  determining a region to be corrected in said first binarized data, as based on a result of comparison provided by the step of comparing;
  binarizing said region in accordance with a third algorithm different from said second algorithm; and
  replacing a value of a pixel of said region with that of a pixel binarized in accordance with said third algorithm.

14. The method according to claim 13, wherein the step of generating said first binarized data includes the steps of:
  extracting a character region from said image data;
  binarizing only said character region to output said first binarized data.

15. The method according to claim 13, wherein the step of generating said first binarized data includes the steps of:
  determining an attribute of a pixel included in said image data; and
  in accordance with a value of a pixel that is determined in the step of determining as having an attribute of a character, binarizing said image data to output said first binarized data.

16. A computer readable medium encoded with an image processing program which can be executed by an image formation apparatus receiving image data, the program causing said image formation apparatus to perform the steps of:
  binarizing said image data in accordance with a first algorithm to output first binarized data;
  binarizing said image data in accordance with a second algorithm different from said first algorithm to generate second binarized data;
  comparing said first and second binarized data;
  determining a region to be corrected in said first binarized data, as based on a result of comparison provided by the step of comparing;
  binarizing said region in accordance with a third algorithm different from said second algorithm to binarize said image data; and
  replacing a value of a pixel of said region with that of a pixel binarized in accordance with said third algorithm.

17. The computer readable medium according to claim 16, wherein said image processing program is configured for causing said image formation apparatus in the step of binarizing said image data in accordance with said first algorithm to output said first binarized data to perform the steps of:
  extracting a character region from said image data; and
  binarizing only said character region to output said first binarized data.

18. The computer readable medium according to claim 16, wherein said image processing program is configured for causing said image formation apparatus in the step of binarizing said image data in accordance with said first algorithm to output said first binarized data to perform the steps of:
  determining an attribute of a pixel included in said image data; and
  in accordance with a value of a pixel that is determined in the step of determining as having an attribute of a character, binarizing said image data to output said first binarized data.

* * * * *